United States Patent
Sammon (10) Patent No.: US 8,837,900 B2
(45) Date of Patent: Sep. 16, 2014

(54) UNINTENDED VIDEO RECORDING DETECTION IN A VIDEO RECORDING DEVICE

(75) Inventor: Russell P. Sammon, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1106 days.

(21) Appl. No.: 12/777,531

(22) Filed: May 11, 2010

(65) Prior Publication Data

US 2011/0280551 A1    Nov. 17, 2011

(51) Int. Cl.
| | |
|---|---|
| H04N 5/77 | (2006.01) |
| H04N 9/80 | (2006.01) |
| H04N 5/94 | (2006.01) |
| H04N 21/443 | (2011.01) |
| H04N 21/4335 | (2011.01) |
| G11B 27/32 | (2006.01) |
| H04N 21/44 | (2011.01) |
| H04N 21/442 | (2011.01) |
| H04N 21/433 | (2011.01) |
| G11B 27/034 | (2006.01) |
| H04N 5/91 | (2006.01) |

(52) U.S. Cl.
CPC ............ *H04N 5/91* (2013.01); *H04N 21/4436* (2013.01); *H04N 21/4335* (2013.01); *H04N 5/772* (2013.01); *G11B 27/322* (2013.01); *H04N 21/44008* (2013.01); *H04N 21/4424* (2013.01); *H04N 21/4334* (2013.01); *G11B 27/034* (2013.01)
USPC ............ 386/224; 386/242; 386/248; 386/263

(58) Field of Classification Search
None
See application file for complete search history.

(56) References Cited

U.S. PATENT DOCUMENTS

| | | | | |
|---|---|---|---|---|
| 5,521,638 | A * | 5/1996 | Dezaki et al. ............ | 348/208.16 |
| 2007/0283269 | A1* | 12/2007 | Obrador et al. ............... | 715/723 |
| 2009/0273682 | A1* | 11/2009 | Shekarri et al. ............ | 348/207.1 |
| 2010/0085430 | A1* | 4/2010 | Kreiner et al. ................ | 348/143 |
| 2010/0232770 | A1* | 9/2010 | Prestenback et al. ......... | 386/126 |

OTHER PUBLICATIONS

Sony Video Camera Recorder Operating Instructions, 3-861-901-11 (1), 1998 by Sony Corporation.
Encore Electronics, ENXDVR-4C Digital Surveillance in a Box 4 Channel Digital Video Recorder and 4 CCD Security Cameras with Night Vision User's Manual, 2010 by Encore Electronics Inc.

* cited by examiner

*Primary Examiner* — Heather Jones
(74) *Attorney, Agent, or Firm* — Edell, Shapiro & Finnan, LLC (57) ABSTRACT

Techniques are provided for determining occurrence of an unintended video recording in a device. One or more features of a video recording are analyzed in the video recording device to determine whether at least a portion of the video recording is unintended. If one or more portions are determined to be unintended, one or more actions are initiated in the video recording device.

15 Claims, 9 Drawing Sheets

| VIDEO FILE PATH | START TIME | STOP TIME | INTENDED? |
|---|---|---|---|
| VID00001.MP4 | 2010-03-16 10:44:01 AM | 2010-03-16 10:45:19 AM | YES |
| VID00002.MP4 | 2010-03-17 5:32:18 PM | 2010-03-17 5:33:06 PM | YES |
| VID00003.MP4 | 2010-03-17 5:36:06 PM | 2010-03-17 5:34:06 PM | NO |
| VID00006.MP4 | 2010-03-16 10:44 AM | 2010-03-16 10:44 AM | MIXED |

| VIDEO FILE PATH | START TIME | STOP TIME | INTENDED? |
|---|---|---|---|
| VID00001.MP4 | 2010-03-16 10:44:01 AM | 2010-03-16 10:45:19 AM | YES |
| VID00002.MP4 | 2010-03-17 5:32:18 PM | 2010-03-17 5:33:06 PM | YES |
| VID00003.MP4 | 2010-03-17 5:36:06 PM | 2010-03-17 5:34:06 PM | NO |
| VID00006.MP4 | 2010-03-16 10:44 AM | 2010-03-16 10:44 AM | MIXED |

FIG.9

UNINTENDED VIDEO RECORDING DETECTION IN A VIDEO RECORDING DEVICE

TECHNICAL FIELD

The present disclosure relates to audio and video devices for recording and storing video recordings.

BACKGROUND

Handheld video camcorders are now so small that they can easily fit in a user's pocket. This is convenient for users, but creates a problem that camcorders can inadvertently start recording video while inside a user's pocket. This can result in wasted battery power or memory as the camcorder records video of the inside of the user's pocket.

Some camcorders have special mechanical switches or buttons that are less likely to be activated accidentally. However, these mechanical protections sometimes make it more difficult for the user to activate the camcorder when he actually wants to record a video, and even the best mechanical designs can still be actuated inadvertently in a pocket, suitcase, or backpack.

Similarly, a user may start video recording, but then forget to press the "stop" button to stop recording the video before putting the camcorder away in a case or pocket. This will also result in wasted battery power or space in the device's memory.

DETAILED DESCRIPTION OF THE DRAWINGS

Overview

Techniques are provided for detecting unintended video recording in a video recording device, such as, but not limited to, a handheld video recording device. One or more features of a video recording are analyzed to determine whether at least a portion of the video recording is unintended. Detecting an unintended video recording may involve any of a variety of techniques including analyzing image data for one or more individual frames of a video recording, analyzing audio features of the video recording, determining an orientation of the video recording device, etc. When one or more portions of the video recording are determined to be unintended, one or more actions are initiated. For example, the video recording device may stop recording such that the portion determined to be unintended is not stored into memory, the device may power off and/or the device may present an alert to a user.

Example Embodiments

Figure 1:
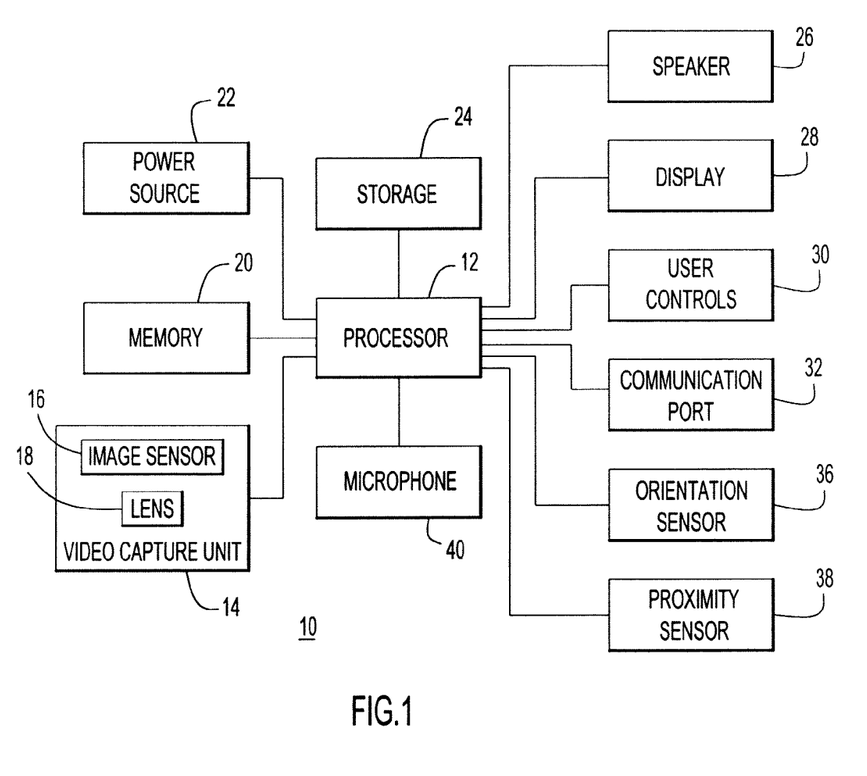
FIG. 1 is an example of a block diagram for a video recording device configured to record and analyze video and audio to determine whether a video recording is unintended.

Referring to FIG. 1, a video recording device is shown at reference numeral 10. At the heart of the video recording device 10 as it relates to the techniques described herein, the device 10 comprises a controller (e.g., a processor) 12, a video capture unit 14 comprising an image sensor 16 and a lens 18, and working memory 20. The working memory 20 is, for example, random access memory (RAM) but may also comprise electrically erasable programmable read only memory (EEPROM), particularly for storage of software instructions. The processor 12 is configured to execute instructions stored in memory 20 for carrying out the various techniques described herein. The processor 12, video capture unit 14 and memory 20 are examples of the basic elements used to perform capturing of video. There are other components shown in FIG. 1 that provide additional supporting roles for the overall operation of the device 10.

Specifically, there is a power source 22, persistent storage or memory 24, speaker 26, display 28, user controls 30, communications port 32, orientation sensor 36, proximity sensor 38 and microphone 40. All of these components are coupled to the processor 12 either directly or by way of a system bus (not shown in FIG. 1 for simplicity).

The power source 22 is configured to supply electrical power for the video recording device 10. Any device capable of supplying electrical power may be used as power source 22. For example, the power source 22 may be a non-rechargeable or rechargeable battery or an alternating current/direct current (AC/DC) power supply or a combination thereof, though it should be understood that any power source can be used.

The persistent storage 24 is a persistent data storage device configured to store data that is obtained by the video recording device 10. Any persistent storage device may be used including a non-volatile storage device such as a hard drive or flash memory, RAM, etc. The persistent storage 24 may be a removable device such as a secure digital (SD) memory card.

The speaker 26 is configured to output audio related to data obtained by the video recording device 10, and the display 28 is configured to display video obtained and/or stored by the video recording device 10. For example, the display 28 is a liquid crystal display (LCD).

The user controls 30 comprise one or more physical buttons and/or any combination of non-physical graphical user interface buttons that may be generated by the processor 12 and displayed on the display 28. Examples of user controls 30 include a Record button, a Play button, a Stop button, a Rewind button, a Fast Forward button, etc., and these are described in further detail hereinafter in connection with FIG. 7.

The communication port 32 is configured to interface the video recording device 10 to an external device. The communication port 32 may be used to transmit the data obtained by the video recording device 10 to an external device via a data link. For example, the communication port 32 may be a universal serial bus (USB), high-definition multimedia interface (HDMI), Ethernet network card, or wide area network or wireless local area network communication interface, such as a 3G wireless chipset or an IEEE 802.11 wireless chipset, or any combination thereof.

The orientation sensor 36 is configured to determine the orientation of the video recording device 10. The orientation sensor 36 may be any device capable of detecting orientation. For example, orientation device 36 may be an accelerometer, gyro, tilt sensor, or any inertial sensor, or any combination of these types of sensors. The proximity sensor 38 is configured to detect the proximity of external objects to the video recording device 10. The proximity sensor 38 may be any device capable of detecting proximity such as an autofocus sensor, capacitive sensor or resistive sensor.

Finally, the microphone 40 is configured to receive audio input obtained by the video recording device 10.

The video capture unit 14 is configured to capture video image frames. The image sensor 16 may be any device configured to detect an optical input and convert an optical input into electrical data. For example, the image sensor 16 may be a charge-coupled device (CCD) or a complementary metal-oxide-semiconductor (CMOS) sensor. The lens 18 may be a fixed or movable auto-focusing lens device. The video capture unit 14 thus captures video image data that may be temporarily stored in the memory 20 and then stored on a more permanent basis in the persistent storage 24.

The processor 12 is capable of executing program logic (i.e., software) for carrying out various operations and tasks. For example, processor 16 can analyze and interpret data received by the video recording device 10, perform computations, cause information to be stored, and control various components of the video recording device 10.

The video recording device 10 may be any device that is capable of recording or capturing video of a scene. For example, the video recording device 10 may be any camcorder device such as the Flip Mino™ and Flip Ultra™, any cell phone or mobile device, personal computer, web camera (webcam), security camera, digital camera, video phone, or other video recording devices capable of recording multiple videos simultaneously or in general any device capable of recording video. Thus, it will be appreciated that the video recording device 10 is not limited to the above examples.

Figure 2:
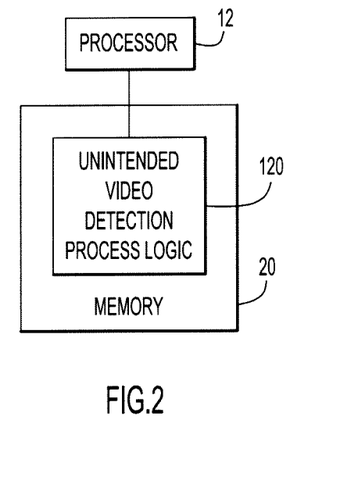
FIG. 2 is an example of a block diagram showing the processor and of the video recording device that is configured to record and analyze video and audio data to detect unintended video recording.

Reference is now made to FIG. 2 for a description of the processor 12 and the memory 20. The processor 12 is, for example, a microprocessor, microcontroller, digital signal processor or other similar data processing device. The memory 20 is a computer-readable memory that stores or encoded with program logic including instructions for unintended video detection process logic 120. The unintended video detection process logic 120, when executed by the processor 12, causes the processor 12 to perform the techniques described hereinafter in connection with FIGS. 3-9.

The functions of the processor 12 may be implemented by logic encoded in one or more tangible media (e.g., embedded logic such as an application specific integrated circuit, digital signal processor instructions, software that is executed by a processor, etc), wherein the memory 20 stores data used for the operations described herein and stores software or processor instructions that are executed to carry out the operations described herein. Thus, the process logic 120 may take any of a variety of forms, so as to be encoded in one or more tangible media for execution, such as fixed logic or programmable logic (e.g., software/computer instructions executed by a processor) and the processor 12 may be an application specific integrated circuit (ASIC) that comprises fixed digital logic, or a combination thereof. For example, the processor 16 may be embodied by digital logic gates in a fixed or programmable digital logic integrated circuit, which digital logic gates are configured to perform the process logic 120. In another form, the process logic 120 may be embodied in a processor readable medium that is encoded with instructions for execution by a processor (e.g., a processor 12) that, when executed by the processor, are operable to cause the processor to perform the functions described herein in connection with process logic 120.

When recording or capturing video for a scene, the process logic 120 is configured to process the recorded video to determine whether it is unintended. For example, an unintended video recording may be the result of the video recording device 10 recording video while inside of a camera case, suitcase, backpack, or user pocket. If the recorded video is determined to be unintended, then the video recording device 10 may alert the user to confirm that the video is in fact intended. For example, the video recording device 10 may alert the user with an on-screen prompt or audio prompt. If the user does not confirm that the video is intended, then the video recording device 10 may automatically stop recording or capturing the video, turn itself off, or delete the unintended video.

As used herein, the term "unintended video" refers to a video recording or any portion/segment of a video recording that is determined to be not intended and caused by either unintended actions of a user or unintended actions of the video recording device. For example, an unintended video recording may result when a user puts the video recording device 10 in a pocket, purse, carrying case or backpack while the video recording device 10 is recording or when a button is inadvertently depressed by movement of the video recording device inside a packet, etc. In another example, an unintended video recording may occur when a user is holding the video recording device 10 and is not aiming or pointing the video recording device 10 at the scene, but instead is for example, aiming or pointing the video recording device 10 towards the ground or towards or the user's palm that is covering lens 18. In another example, an unintended video may result when a user accidentally engages the user controls 30 multiple times when trying to terminate the recording of a scene. This may cause the video recording device 10 to start a second video recording after finishing a first video recording.

Video images are "captured" when they are detected by the video capture unit 14 and temporarily stored before storage in the persistent storage 24 or otherwise stored in a more permanent form in the device 10.

The term "video recording" refers to the process of storing captured video data in the device 10 and also to the stored video recording data itself. The captured and stored video data may comprise both video data representing image frames of a scene and audio data representing audio detected by the microphone of the device or other audio data supplied to the device that is to be associated with the captured video data.

Figure 3:
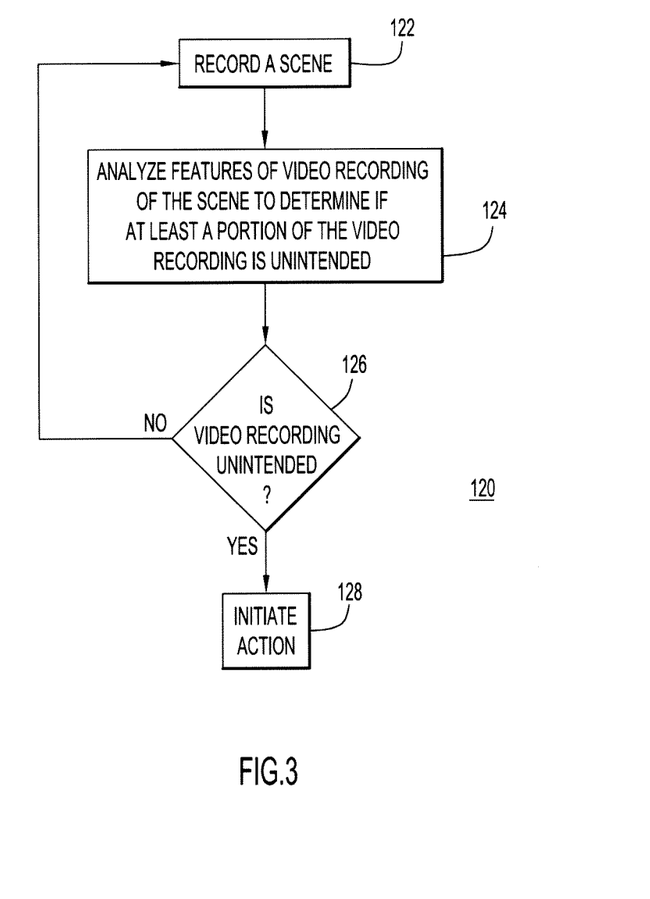
FIG. 3 is an example of a flow chart depicting a process for determining whether a video recording is unintended.

Reference is now made to FIG. 3 for a description of the unintended video detection process logic 120. FIG. 3 shows a functional flow diagram of operations performed to determine whether a captured video or video recording of a scene is unintended. In operation 122, the video recording device 10 captures and records video data for a scene. In one implementation, the video recording device 10 may capture a video and later transfer the captured video to memory for processing. In addition, the captured video may be saved into storage 24 so that it can later be played back by the user. In another implementation, the captured video may be transmitted to another device external to the video recording device 10 rather than saved into storage 24 or memory 20. For example, a webcam or video phone may capture video and transmit the video over the Internet. In another example, a camcorder may capture video and transmit it wirelessly to a remote storage device. Possible benefits of capturing video and transmitting it include being able to locally store a larger quantity of video data, providing security for video data in the event that the video recording device 10 is lost or damaged, sharing video data remotely with others, and retaining local copies of telepresence conversations.

The video recording device 10 may record or capture audio and video data from a scene in several ways. A user may interact with user controls 30 to initiate the data collection for a scene. In one example, a user may press a Record button to initiate the data collection. In another example, a user may use voice activation techniques to initiate the data collection, or the video recording device 10 may use a timer or sensor to automatically initiate the data collection. In still another example, before a user initiates the data collection, for example by pressing a Record button, the video recording device 10 may record the captured scene in a loop of a predetermined time interval and store the data from the loop into memory 20 or storage 24. The loop may be used as a starting point for the recorded video once the user initiates the data collection. For example, the video recording device 10 may loop the most recent ten seconds of a captured video and store it into memory 20 or storage 24, and then, when a user initiates the data collection, the loop may be used as a starting point for the data collection. In another example, the video recording device 10 may automatically start and stop the recording or capturing of audio and video data based on its own determination to initiate data collection rather than a user initiating the data collection. It will be appreciated that the recording a scene operation 122 is not limited to the examples described above and that the recording can be initiated in other ways.

As the scene is recorded, operation 124 analyzes features of the video recording to determine if at least a portion of the video recording is unintended. At 126 it is determined whether at least a portion of the video recording is unintended. If at least a portion of the video recording is determined to be unintended, operation 128 initiates one or more actions. If a video recording is not determined to be unintended, the video recording device 10 continues to record the scene. Operation 124 may be conducted before a video is recorded into persistent storage 24, while a video is recorded into persistent storage 24, or after a video is recorded into persistent storage 24.

Figure 4:
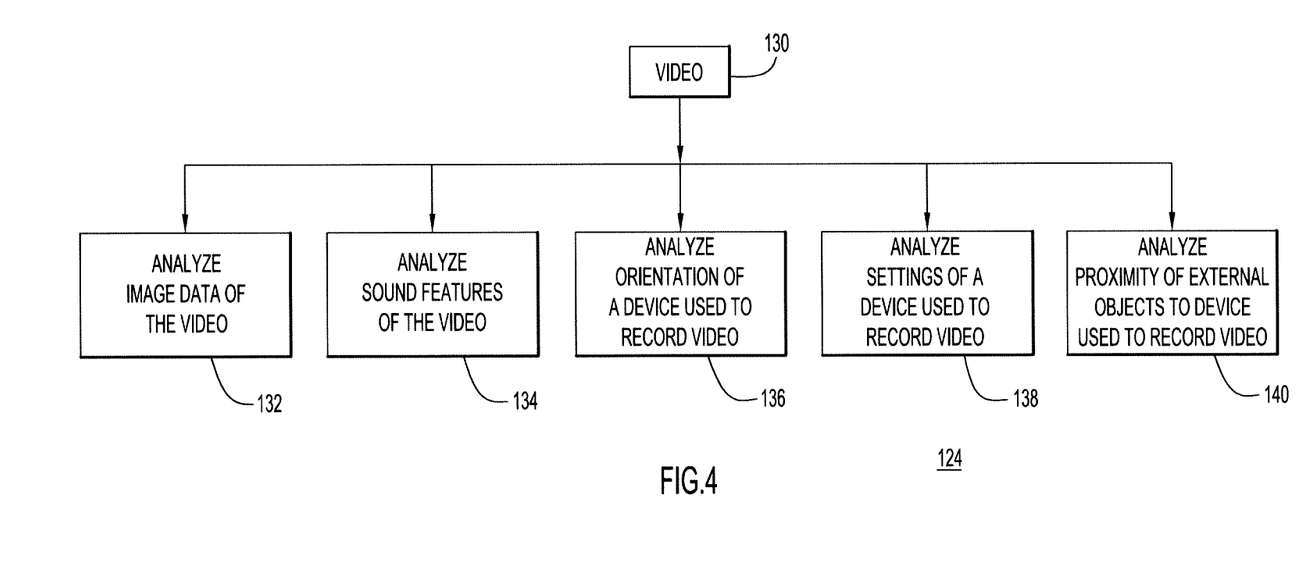
FIG. 4 is an example of a flow chart depicting various processes for analyzing features of a recording to detect an unintended video recording.

Reference is now made to FIG. 4 for a description of operation 124 for analyzing features of a video recording to determine if at least a portion of the video is unintended. There are several ways that the analysis operation 124 may be performed and FIG. 4 shows that these analysis techniques may be performed alone, parallel with other each other or in a serial fashion.

Operation 132 analyzes video image data of the video recording. For example, the processor 12 may perform operation 132 by analyzing individual frames of the video to determine whether at least a portion of a video recording has one or more characteristics indicative of an unintended recording. The processor 12 may analyze video image data for the individual frames of the recorded video to determine if the recorded image is in focus. An unintended video may be out of focus because the lens 18 has a minimum focus distance. When the video recording device 10 is inside of a pocket of a user (or inside some other container), the image data may be out of focus because the pocket or container material is touching or otherwise is very close in distance to the lens 18 so that the lens cannot properly focus and therefore the image data will be out of focus.

In another example, image data for a video recording may be out of focus if an obstruction, such as a user's finger, is directly in front of the lens 18. One way that individual frame focus could be determined is by performing an edge detection filter function on the image data for on a frame of the video. In another example, the processor 12 may perform operation 132 by analyzing particular key or processor selected frames to determine if the image data for the recorded video is mostly or entirely dark, determined by analyzing the average pixel intensity over the frame. In another example, the processor 12 may perform operation 132 by determining if the image data is "shaky" based on the optical flow gathered from the image data frame analysis. Some video "shake" is normal when recording and capturing a video, but an unintended video recording might contain shaking that exceeds a threshold value. The amount of shaking is determined from the amount of motion or difference between image data of successive video frames. Excessive shaking of the video recording device 10 may be indicative that a user is no longer trying to hold the video recording device 10 steady and therefore that the video recording is unintended.

Operation 134 involves analyzing sound or audio features of the video recording. For example, the processor 12 may perform operation 134 by detecting muffled sounds, rustling sounds or other sound features that have characteristics that are indicative of an unintended video. A sound may be muffled because the video recording device 10 is inside a pocket or a case. Muffled sounds may have lower amplitudes and be lacking in high frequency components, and these sounds may be detected by the use of an analog or digital filter processing of digital audio data for the video recording by the processor. Additionally, sound features of the video can be compared to a known pattern of sound that serves as a template for unintended video. For example, the sound features of a video may be compared to a template sound pattern corresponding to characteristic sound features of rustling fabric present inside of a pocket or case.

Operation 136 involves analyzing the physical orientation of the device 10. For example, processor 12 may perform operation 136 by detecting that the video recording device 10 is shaking, bouncing, or oriented in a manner indicative of an unintended video. The processor 12 may analyze output of the orientation sensor 36 (comprising a tilt sensor) at a period of time corresponding to a portion of a video recording to determine the orientation of the video recording device 10. The orientation sensor 36 may also comprise gyros or accelerometers the output of which may be used for video stabilization. If the video recording device 10 is determined to be oriented downwards, this may be indicative of an unintended video. Also, a change in orientation may be an indication that a user is finished with recording or capturing a video.

Operation 138 involves analyzing video recording settings of the video recording device 10. For example, operation 138 may be performed by measuring exposure characteristics such as shutter speed, aperture, and ISO, of the video recording device 10 that may be indicative of an unintended video.

The video recording device 10 may have auto-exposure features in the video capture unit 14. If the video recording device 10 adjusts its exposure parameters to deal with low light conditions, exposure characteristics such as large aperture setting, long shutter speed, and/or high ISO may be indicative of unintended video recording. In another example, operation 136 may be performed by measuring focus distance. The focus distance for lens 18 may be determined by auto-focus functions of the video capture unit 14 of the video recording device 10. If the focus distance is very small, for example less than 5 cm, then this may be an indication that a user is capturing unintended video. Operation 138 may be less computation intensive than analyzing the video recording but can be just as effective.

Operation 140 involves analyzing the proximity of external objects to the video recording device 10. For example, operation 140 may be performed by a capacitive sensor to determine if the camcorder is currently being held in a user's hand. Operation 140 may also be performed by an autofocus sensor or a resistive sensor.

As the analysis operation 124 is being performed on video data and/or audio data, operation 126 determines if at least a portion of the video recording is unintended. Operation 126 may be performed based on one or a combination of the operations used to perform the analysis operation 124. For example, a processor can use operations 132 and 136 together to determine if at least a portion of the video is unintended. In this example, the processor can use operations 132 and 136 contemporaneously to determine, for example, that the video recording device 10 is shaking more than usual and at the same time that the video is dark and unfocused, which may indicate that the video is unintended. In another example, a processor can use operations 132 and 134 together to determine if at least a portion of the video is unintended. In this example, the processor can use operations 132 and 134 together to determine that the video recording device 10 is dark at the same time that a rustling sound is recorded by the microphone, which may indicate that the video is unintended.

Operation 126 may involve applying an intent rating for the video. The processor 12 may use an intent rating for the video to provide a quantitative indication of whether the video is likely intended by the user. For example, a processor may use an intent rating on a scale of 0 to 100, with 0 indicating a definite unintended video recording and 100 indicating a definite intended video. In one example, if the intent rating is greater than a threshold value, then the video may be determined to be intended. In another example, if the intent rating is less than a threshold value, then the video may be determined to be unintended. The processor 12 may use the intent rating system based on one or a combination of the operations used to perform the analysis operation 124.

Operation 126 may also involve identifying the unintended portion of the video based on a time code, frame number, byte location or other indication of where the unintended video begins, relative to the start of the entire video. For example, an unintended video may be identified as beginning at a particular time code and ending at the end of the video recording. In another example, the unintended video may be identified as beginning at a particular time code and ending at a particular time code. In another example, the unintended video may be identified as beginning at a particular frame number and ending a particular frame number, such as frame number 0. In another example, the unintended video may be identified as being the entire video recording except for a portion between certain frame numbers. Operation 126 may also determine that there are multiple unintended segments or portions in a video recording and may identify the multiple unintended portions based on codes, frame numbers, byte locations or other indications of where the unintended portions begin.

Operation 126 may also be used to determine a portion of a video to be unintended. For example, a first portion of a video may be determined to be intended and a second portion of the same video may be determined to be unintended. In an example, a user may forget to press a Stop button in the user controls 30 to stop the data collection. In this example, the video recording contains two parts, an intended first portion and an unintended second portion. In another example, a first portion of a video may be determined to be unintended and a second portion of the same video may be determined to be intended. For example, a user may press the Record button in the user controls 30 sooner than desired to initiate the data collection. In another example, an entire portion of a video recorded may be determined to be unintended in which the record function is engaged (through a variety of actions or inactions) that result in the inadvertently and unintended data collection.

Figure 5:
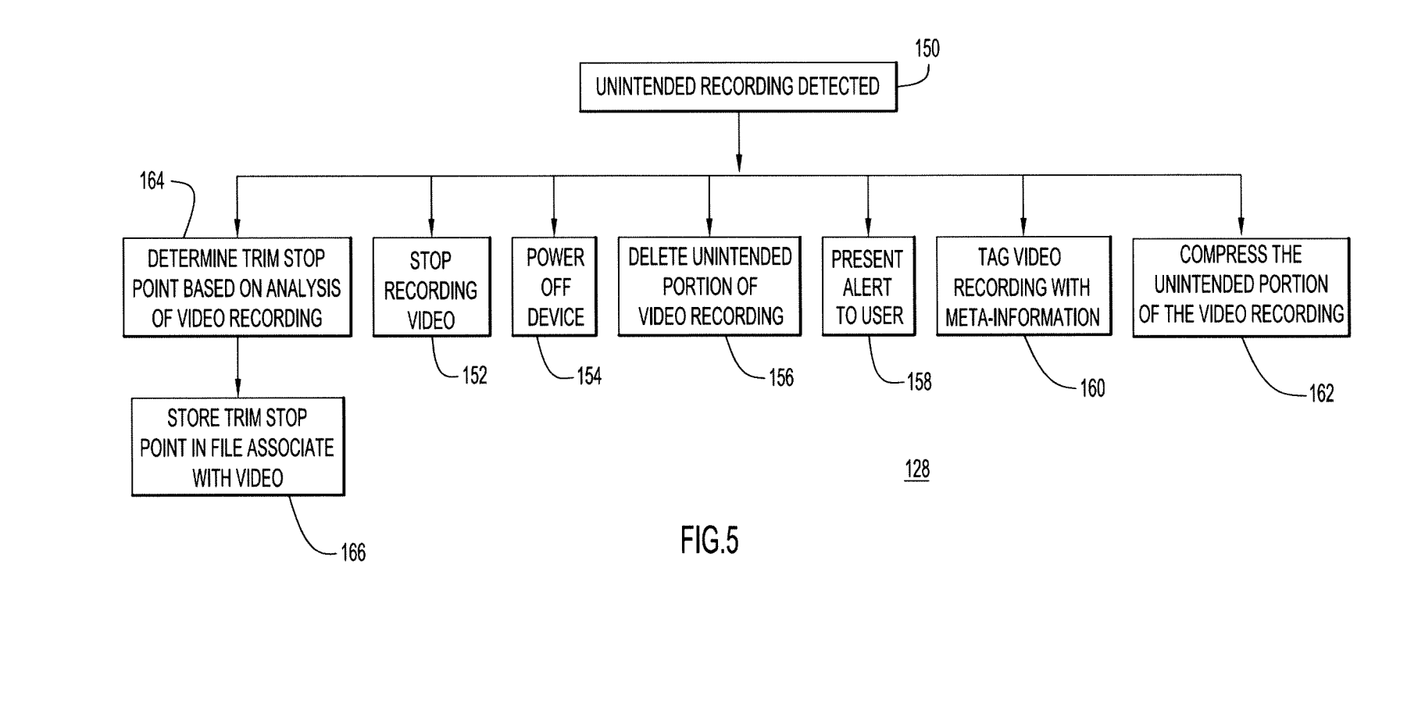
FIG. 5 is an example of a flow chart depicting a process for initiating actions in the video recording device when an unintended video recording is detected.

Reference is now made to FIG. 5 for a description of various actions that may be initiated at operation 128. There are several actions that may be initiated, either alone, in parallel or in a serial fashion.

Operation 152 stops the capturing or recording of the scene. For example, once operation 126 determines that at least a portion of the video recording is unintended, the processor 12 may cause the video recording device 10 to cease recording the unintended video. In another example, the processor 12 may stop the video recording device 10 from both capturing and recording the scene. In this example, it is possible that the unintended video may no longer be stored into storage 24 or memory 20. In another example, the processor 12 may cause the video recording device 10 to stop only the recording of the scene and to continue capturing the scene. A recording device may be switched to a capturing mode that continues to capture video of the scene without storing the captured video. This may be helpful if a scene recording later becomes intended, in which case the video recording device could perform operations 122 and 124 to begin recording and analyzing the scene.

Operation 158 involves powering off the video recording device 10. In one example, the processor 12 may control power from the power supply 22 to turn off or to otherwise put the video recording device 10 into a standby mode. In one example, the processor 12 may put the video recording device 10 into a standby mode prior to causing the video recording device 10 to power off. When the video recording device 10 is a cellular telephone device, putting the video recording device 10 into a standby mode prior to causing the video recording device 10 to power off may be beneficial since cellular phones are often kept in a standby mode to enable them to receive incoming calls, email message or text messages. Operation 158 has a benefit, among others, of preventing the video recording device 10 from losing power from capturing and recording an unintended video and also saving power for the video recording device 10, which may allow a user to record more intended video recordings at a later time.

Operation 156 involves deleting the unintended portion of the video recording. For example, an unintended video portion may be deleted soon after operation 126 determines that at least a portion of the video recording is unintended. In this example, a video recording device 10 may detect an unintended video, cease to capture it, and turn off the device 10. In another example, an unintended video portion may be deleted some time later than the time when operation 126 determines that at least a portion of the video recording is unintended, such as when the processor 12 determines that memory 20 or storage 24 is close to maximum capacity. In this example, the processor 12 may initiate a process of finding and deleting the unintended video portions that are stored in memory 20 or storage 24. In this example, the unintended video portions could be deleted once the available space in the memory 20 or storage 24 goes below a threshold value. In another example, an unintended video portion may be deleted once the unintended video has been transferred to a backup storage device. A backup storage device could be any device external to the video recording device 10 that is capable of storing data, such as a personal computer or a file server. In another example, an unintended video portion may be deleted after a threshold period of time after the video was recorded. In another example, an unintended video portion may be deleted after a user initiates a menu option to delete all unintended video portions. Performing operation 160 has a benefit, among others, of saving data space for memory 20 and storage 24, which may allow a user to record additional intended video recordings at a later time. In addition, these actions may be convenient to a user to prevent the clutter of unintended video portions.

Operation 158 involves presenting an alert to a user upon determination that at least a portion of the video recording is unintended. The alert may be presented to a user at any time. For example, the alert may be presented to a user while a scene is being captured or recorded, after the video recording device 10 finishes capturing or recording a scene, or while a video recording is being played back to a user. Also, the alert may be presented to a user when a user turns on the video recording device 10, when a user plays back an intended video recorded that is linked to or comprises an unintended video recording, when a user deletes a video recording file from the video recording device 10, or when the user views a video recording file on the video recording device 10.

The alert may be presented to a user in any form. For example, an alert may be an audio alert, a visual alert, or combination of the two. An alert may be used to inform a user that at least a portion of the video recording has been determined to be unintended. In one example, a visual alert in the form of text may be displayed on the display 28 indicating that a portion of a video recording is unintended. The alert may prompt a user to perform an action to acknowledge or confirm the determination of an unintended video, or the alert may prompt a user to perform an action to prevent the video recording device from initiating any of the actions described herein for operation 128. For example, an alert may prompt a user to view, save, or delete the unintended video portion. In another example, the alert may be a visual alert and audio alert in the form of a warning light or sound presented to a user. For example, a cell phone may buzz a vibrating ringer to indicate that presence of an unintended video portion and to warn a user that one or more of the operations described for operation 128 may about to be initiated. In another example, an alert may be a message that is transmitted to a peripheral device. For example, a cell phone may transmit a beep tone to a Bluetooth™ or other wireless headset to indicate to a user the presence of an unintended video recording and to warn a user that one or more of the operations described for operation 128 may about to be initiated. In another example, an alert may be a visual alert or an audio alert that indicates which video recording or portion of video recording has been identified as unintended. For example, the alert may indicate that the current video recording is unintended, that a particular video number corresponding to a video recording is unintended, that a particular amount of time in a video recorded is unintended, or the number of video recordings that are unintended.

In one example, when operation 158 presents an alert to a user, a user may not be aware of the alert until after some time. In this example, operation 158 presents an alert to a user that has appropriate default behavior if the user does not receive the alert immediately. For example, the video recording device 10 may wait for the user to respond to the alert. To respond to the alert, a user may select a button or other control or combination of controls that is a part of the user controls 30. In another example, the video recording device 10 may perform a default action if a user does not respond to an alert within a predetermined period of time or if a user responds to an alert in an inappropriate manner such as engaging a wrong button or control of the user controls 30. For example, the default action may be to record the scene as normal, to cease recording the scene, or to perform any of the actions described herein for operation 128. When a user is presented with an alert, the user may be given options of actions capable of being performed on the unintended video portion. For example, a user may be presented with an option to delete the unintended video, to delete only a portion of the unintended video, to save the unintended video, to save only a portion of the unintended video, or to tag or otherwise indicate that the unintended video or a portion of the unintended video should be classified as an intended video portion. Examples of user alerts are described further hereinafter in connection with FIG. 8.

Operation 164 involves tagging a video recording with meta-information relating to the intended/unintended status of the video recording. These tags may be displayed to the user, or otherwise affect the processing of the video. In one example, an indication of an unintended video portion, such as start and stop times of the unintended video portion, may be stored as meta-information in a video recording data file. In another example, an indication of an unintended video portion, such as the video name or start and stop times of the unintended video portion, may be stored in a second data file. The tags with meta-information may be related to several types of information. For example, the tags may indicate the status of a video recording as being intended or unintended, the portion of time in a video recording during which an unintended video portion occurs, the intent rating associated with the video recording, and the factors that caused a video portion to be classified as intended or unintended. The tags with meta-information may also be used to later organize video files containing unintended video portions.

Operation 162 involves compressing the unintended video portion of a video recording. In one example, once a portion of a video recording is determined to be unintended, the video recording device 10 may continue to record the unintended video using different settings, such as higher compression ratios, lower bit rates, and lower resolution, to reduce the amount of space taken up by the unintended video in a memory 20 or storage 24. For example, if multiple video streams are being recorded, such as those for 3-dimensional (3D) video recordings, one of the multiple video stream recordings may be terminated while the remaining video streams continue to be recorded.

Operation 164 involves determining a trim stop point in the video recording based on the analysis operation 124 of the video recording and the determination operation 126. For example, trim stop points for a video recording may be set to demarcate at least one intended segment or portion of a video recording from at least one unintended segment or portion of the video recording. The trim stop points may, for example, indicate a start time and a stop time. The user may adjust the trim points for the video, thereby updating which portions of the video are intended and unintended. For example, the end of a video may be marked as unintended and may be demarcated using a trim stop time tag. A user may utilize a trim adjustment process to push back the trim stop time tag to adjust the portion of the video recording that is demarcated as unintended video. In this example, at the end of the trim adjustment process, the remaining unintended video may be deleted or the remaining unintended video may be kept in case a user wants to review it again at a later time. After the processor performs operation 164 to determine a trim stop point, the processor may perform operation 166 to store the trim stop point in a file associated with the video. For example, an unintended video may be stored in a separate file from the intended video. The user may view the unintended video file and perform a trim adjustment process for the unintended video. The user may decide that unintended video should remain stored in storage 24 in case the user wants to review the unintended video at a later time. In this example, the original unintended video may be marked with meta-tag information or may be moved to a different folder in storage 24 of the video recording device 10. In another example, operation 164 may be an auto-trim feature. In this example, an auto-trim feature may trim off an initial portion of a video recording if the initial portion is determined to be unintended or an end portion of a video recording if the end portion of the video recording is determined to be unintended. Additionally, the auto-trim feature may trim a video recording into more than two portions, particularly if the unintended portion is located in the middle of a video recording session within intended portions of a video recording before and after the unintended portion. Operation 164 may be non-destructive such that trimming a video recording data file occurs without removing any video data from the file itself. For example, trim points may be saved as meta-information in the video data file. On the other hand, the features of operation 164 may also be destructive such that trimming the video data file involves removing information from the video file. For example, an unintended video portion of a video may be deleted or stored in a separate video file. In still another example, operation 164 may provide a user with an option for re-trimming a video at a later time after an initial trim operation.

Figure 6:
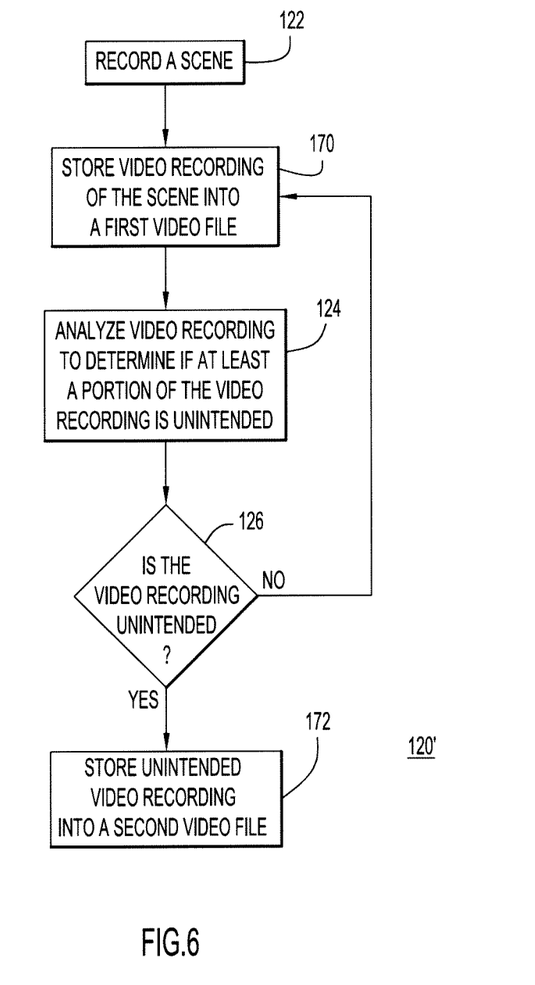
FIG. 6 is an example of a flow chart depicting a storing process for a recording, a portion of which is determined to be unintended.

Reference is now made to FIG. 6 for a description of another form of the unintended video detection process logic 120 and thus identified in FIG. 6 by reference numeral 120'. As described above in connection with FIG. 3, in operation 122 the video recording device 10 captures and records video data for a scene. After a video data for a scene is captured and recorded, operation 170 stores the video recording into a first video file. In one example, the video recording may be stored individually or in any combination of memory 20, storage 24, and an external storage device. The video recording may be stored into a first video file after the video recording device 10 finishes capturing and recording video data for a scene. The video recording may also be stored into a first video file continuously and contemporaneously as the video recording device 10 captures and records a scene. After operation 170 causes the video recording to be stored, operation 124 analyzes the video recording to determine if at least a portion of the video recording is unintended, and operation 126 makes the decision that a portion of the video recording is unintended as described above. When operation 126 determines that at least a portion of the video recording is unintended, operation 172 stores the unintended video portion into a second video file. The unintended video portion may be stored individually or in any combination of memory 20, storage 24, and an external storage device. The unintended video portion may be stored into a second video file after the video recording device 10 finishes capturing and recording video data for a scene. The unintended video portion may also be stored into a second video data file continuously and contemporaneously as the video recording device 10 captures and records a scene. For example, if a first portion of a video recording is intended and a second portion of a video recording is unintended, the first intended portion may be saved into a first video data file while the second unintended portion may be saved into a separate, second video file.

The operations described in connection with FIG. 6 have the benefit of simplifying any potential deletions of unintended video portions by a user. For example, deleting a file may be simpler and quicker than removing a portion or segment of a video file. Additionally, the operations described in FIG. 6 have the benefit of simplifying tagging of unintended video portions. For example, an entire video data file may be tagged as either intended or unintended. The files containing unintended video portions may also be stored in a special directory in the memory 20 or storage 24 of the video recording device 10, which may make it easier for a user to identify, locate, or delete any unintended video portions if the memory 20 or storage 24 is running low on storage space.

Figure 7:
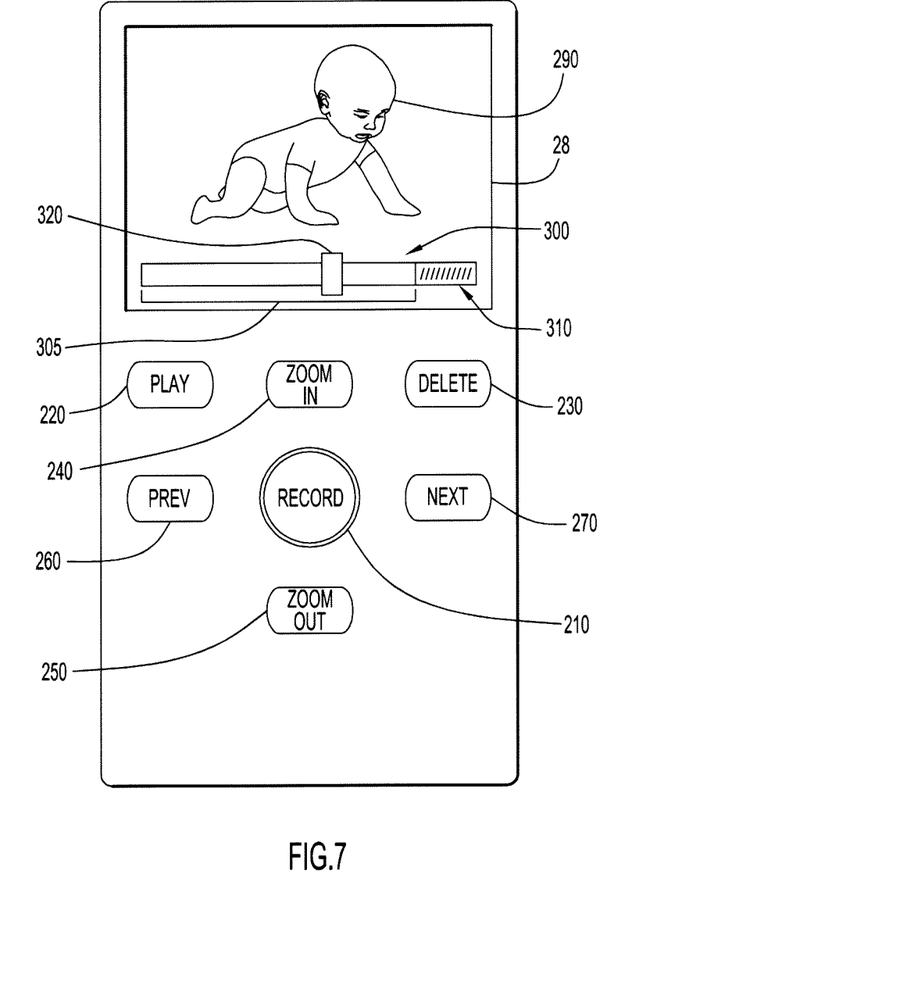
FIG. 7 is an example of a diagram of a video recording device showing a screen display of an image of a video recording and also showing user interface controls to allow a user to trim an unintended portion out of a video recording that contains intended portions.

Reference is now made to FIG. 7. FIG. 7 shows an example form of the video recording device 10 and showing examples of user controls 30 of the video recording device 10. Specifically, a Record button 210 is provided that can be pressed to initiate the capturing or recording of a scene, to stop an already existing capturing or recording of a scene, or to toggle between capturing or recording a scene and stopping a capturing or recording of a scene. A Play button 220 is provided that can be pressed to initiate a play back of a previously recorded video recording or a portion of a previously recorded video recording. A Delete button 230 is provided that can be pressed to delete a previously recorded video recording or a portion of a previously recorded video recording. A Zoom In button 240 is provided that can be pressed to magnify a particular aspect of a scene as it is being captured or recorded by the video recording device 10. The Zoom In button 240 can also be pressed to magnify a particular aspect of a previously recorded video recording during play back of the video recording. A Zoom Out button 250 is provided that can be pressed to zoom out on a particular aspect of a scene as it is being captured or recorded by the video recording device 10. The Zoom Out button 250 can also be pressed to zoom out on a particular aspect of a previously recorded video recording during play back of the video recording. A Previous button 260 is provided that can be pressed to select and retrieve previously recorded video recordings in a reverse sequence. A Next button 270 is provided that can be pressed to select and retrieve previously recorded video recordings in a forward sequence.

A display 28 of the video recording device 10 is shown in FIG. 7. Image data for captured or recorded video data of a scene is shown at 290. The image data 290 may be video data of a scene that is contemporaneously recorded or captured or may be video data of a previously recorded video recording. A reference bar 300 is shown that tracks a current position in a video recording. A length portion 305 of the reference bar 300 indicates an intended portion of a video recording and a length portion 310 of the reference bar indicates an unintended portion of a video recording. A trim bar slider 320 is provided that may be adjusted to view the various portions of a video recording. The elements 300, 305, 320 and 320 are graphical elements generated by the processor of the device 10 for display on the display 28.

Figure 8:
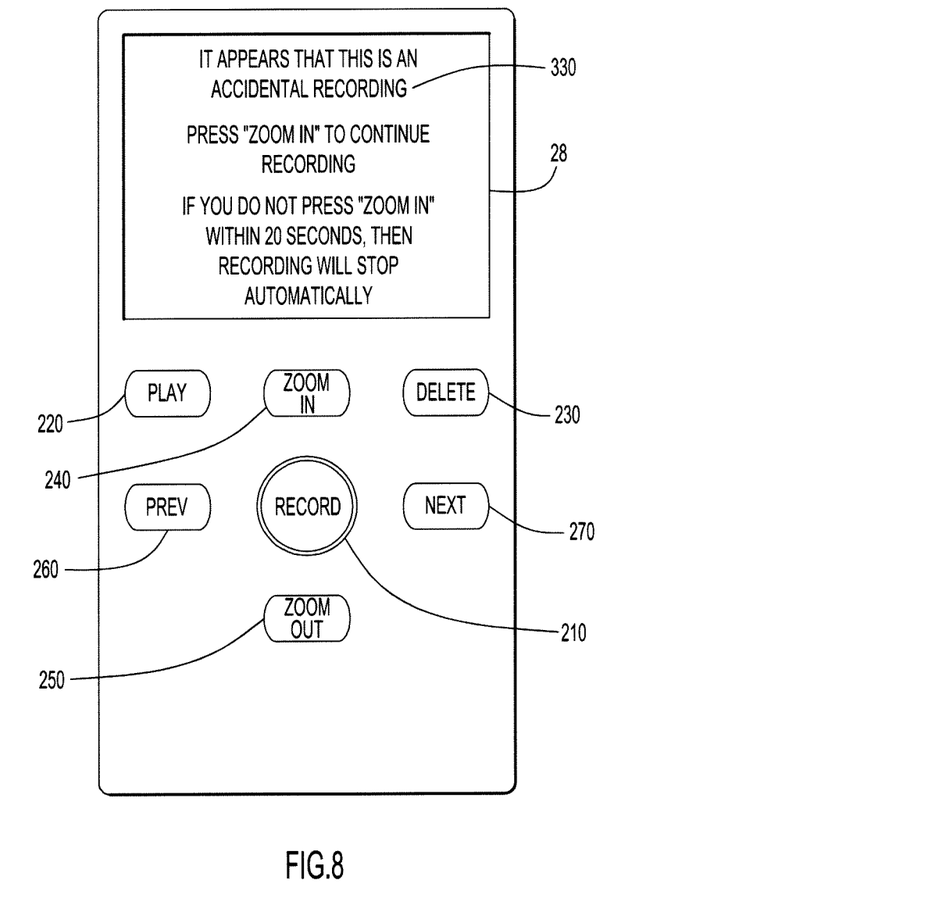
FIG. 8 is an example of a diagram of a video recording device and showing an example of a video screen display alert presented to a user when an unintended video recording is detected.

Reference is now made to FIG. 8. FIG. 8 is similar to FIG. 7 and shows another example form of the video recording device 10. At 330, text is shown displayed on the display 28 as an example of a user alert that may be presented to a user. The text alert 330 may indicate to a user that at least a portion of a video recording is unintended and may present the user with options of actions that the user can take on the video recording device 10 to deal with the unintended portion of a video recording.

Figure 9:
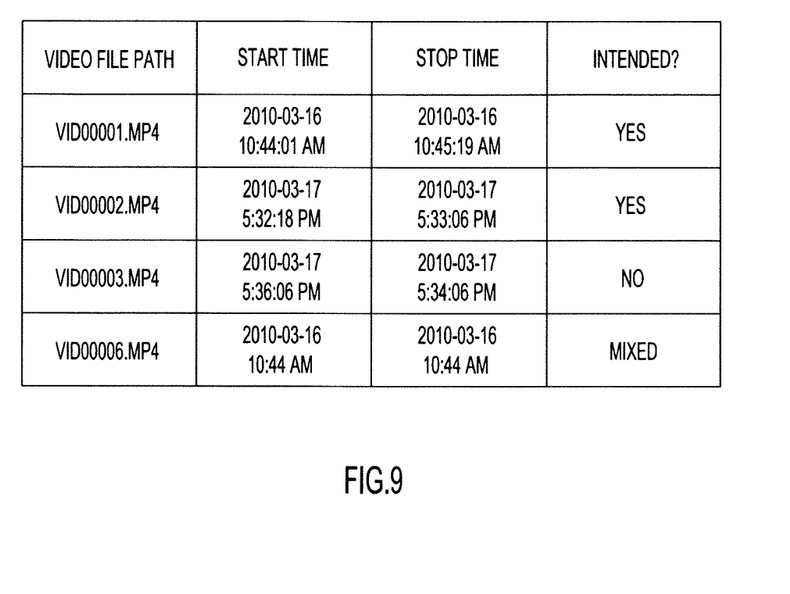
FIG. 9 is an example diagram showing a list of multiple stored video recording files, some of which are flagged as containing unintended video portions.

Reference is now made to FIG. 9. FIG. 9 shows examples of four video recording files and information associated with each video recording file. The information associated with the video recording files may be obtained from any of the methods described above and may be stored in memory 20 or storage 24 in the video recording device 10 or on an external storage device. The example of the video recordings show that that video recording files may be classified or tagged as intended, unintended or as a combination or mix of intended and unintended. For example, "VID00001.MP4" in FIG. 9 is tagged as an intended video recording, "VID00003.MP4" in FIG. 9 is tagged as an unintended video recording, and "VID00006.MP4" is tagged as both an intended and unintended (mixed) video recording.

As will become apparent hereinafter, a device capable of recording video is provided that comprises a video capture unit that is configured to capture video of a scene, a memory configured to store a video recording of the scene, and a processor configured to analyze one or more features of the video recording of the scene and to determine whether at least one portion of the video recording is unintended. Moreover, a computer-readable memory medium is provided that stores instructions that, when executed by a processor, cause the processor to store data for a video recording of a scene in a memory, to analyze one or more features of the video recording of the scene to determine whether at least a portion of the video recording is unintended, and to generate a command to initiate one or more actions based on whether the at least one portion is determined to be unintended.

The above description is intended by way of example only. Various modifications and structural changes may be made therein without departing from the scope of the concepts described herein and within the scope and range of equivalents of the claims.

What is claimed is:

1. A method comprising:
    in a device capable of recording video, recording a scene in a first file;
    in the device, analyzing one or more features of a video recording of the scene to determine whether at least one portion of the video recording is unintended; and
    in the device, initiating one or more actions based on whether the at least one portion is determined to be unintended, wherein the initiating one or more actions comprises presenting to a user a portion of the video recording determined to be unintended and presenting options for the user to initiate commands to save a part of the unintended portion in a second file that is separate from the first file, wherein the first file comprises an intended portion of the video recording and the second file comprises the unintended portion of the video recording without the intended portion; and
    wherein the initiating one or more actions comprises changing recording settings and continuing to capture video of the scene with the changed recording settings, and storing the unintended portion of the video recording in the second file with the changed recording settings.

2. The method of claim 1, wherein analyzing comprises analyzing image data for one or more individual frames of the video recording to determine whether the portion of the video recording has one or more characteristics indicative of an unintended recording.

3. The method of claim 1, wherein analyzing comprises analyzing one or more sound features to determine whether the portion of the video recording has one or more characteristics indicative of an unintended recording.

4. The method of claim 1, wherein analyzing comprises analyzing an orientation of the device using a tilt sensor, a gyro, an accelerometer, or an inertial sensor during a period of time of the portion of the video recording to determine whether the portion of the video recording is an unintended recording.

5. The method of claim 1, further comprising identifying the portion of the recording that is unintended based on one or more of a time code, frame number, byte location, or other indication of where the portion occurs within the video recording.

6. The method of claim 1, wherein initiating one or more actions comprises generating an alert to a user of an occurrence of an unintended recording.

7. The method of claim 1 wherein the analyzing one or more features of a video recording of the scene to determine whether at least one portion of the video recording is unintended occurs prior to the video recording being recorded into a persistent storage.

8. The method of claim 1, wherein the changed recording settings are changed in at least one of compression ratio, bit rate, or resolution.

9. The method of claim 1, wherein changing recording settings comprises terminating at least one but not all of a plurality of video streams that are recorded, such that the video recording of the scene that is recorded in the second file is not a three dimensional video recording.

10. An apparatus comprising:
    a video capture unit that is configured to capture video of a scene;
    a memory configured to store a video recording of the scene in a first file; and
    a processor configured to analyze one or more features of the video recording of the scene and to determine whether at least one portion of the video recording is unintended,
    wherein the processor is configured to present to a user a portion of the video recording determined to be unintended and present options for the user to initiate commands to save a part of the unintended portion in a second file that is separate from the first file, wherein the first file comprises an intended portion of the video recording and the second file comprises the unintended portion of the video recording without the intended portion; and
    wherein after the portion of the video recording is determined to be unintended, the processor is configured to change recording settings and continue capturing video of the scene with the changed recording settings, and store the portion of the video recording determined to be unintended in the second file with the changed recording settings.

11. The apparatus of claim 10, wherein the processor is configured to analyze image data for one or more individual frames of the video recording to determine whether the portion of the video recording has one or more characteristics indicative of an unintended recording.

12. The apparatus of claim 10, wherein the processor is configured to analyze one or more sound features to determine whether the portion of the video recording has one or more characteristics indicative of an unintended recording.

13. The apparatus of claim 10, wherein the processor is configured to generate an alert to a user of an occurrence of an unintended recording, wherein the alert is at least one of an audio alert and a visual alert.

14. A non-transitory computer-readable memory medium storing instructions that, when executed by a processor, cause the processor to:
   store data for a video recording of a scene in a first file of a memory;
   analyze one or more features of the video recording of the scene to determine whether at least one portion of the video recording is unintended; and
   initiate one or more actions in a device based on whether the at least one portion is determined to be unintended by presenting to a user a portion of the video recording determined to be unintended and presenting options for the user to initiate commands to save a part of the unintended portion in a second file of the memory that is separate from the first file, wherein the first file comprises an intended portion of the video recording and the second file comprises the unintended portion of the video recording without the intended portion,
   wherein the instructions that cause the processor to initiate one or more actions comprise instructions that cause the processor to change recording settings and continue to capture video of the scene with the changed recording settings, and store the portion of the video recording determined to be unintended in the second file with the changed recording settings.

15. The non-transitory computer-readable memory medium of claim 14, wherein the instructions that cause the processor to initiate one or more actions comprise instructions that cause the processor to identify the portion of the recording that is unintended based on one or more of a time code, frame number, byte location, or other indication of where the portion occurs within the video recording.

* * * * *